United States Patent
Miki et al.

(10) Patent No.: US 12,490,883 B2
(45) Date of Patent: Dec. 9, 2025

(54) OBJECTIVE OPTICAL SYSTEM, OPTICAL UNIT, AND ENDOSCOPE APPARATUS WITH LENSES OF PARTIALLY SPHERICAL SHAPE

(71) Applicant: OLYMPUS CORPORATION, Tokyo (JP)

(72) Inventors: Takehiro Miki, Tokyo (JP); Mitsuru Namiki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 336 days.

(21) Appl. No.: 18/242,589

(22) Filed: Sep. 6, 2023

(65) Prior Publication Data

US 2023/0404370 A1  Dec. 21, 2023

Related U.S. Application Data

(63) Continuation of application No. PCT/JP2021/009600, filed on Mar. 10, 2021.

(51) Int. Cl.
| | |
|---|---|
| A61B 1/00 | (2006.01) |
| G02B 7/02 | (2021.01) |
| G02B 13/00 | (2006.01) |
| G02B 13/18 | (2006.01) |

(52) U.S. Cl.
CPC ...... *A61B 1/00096* (2013.01); *A61B 1/00174* (2013.01); *A61B 1/00181* (2013.01); *G02B 13/18* (2013.01); *G02B 7/027* (2013.01); *G02B 13/003* (2013.01)

(58) Field of Classification Search
None
See application file for complete search history.

(56) References Cited

U.S. PATENT DOCUMENTS

| | | | |
|---|---|---|---|
| 5,403,308 A | * | 4/1995 | Wood ............ G02B 23/22 359/251 |
| 5,416,624 A | * | 5/1995 | Karstensen ...... G02B 6/29361 398/139 |
| 6,755,532 B1 | | 6/2004 | Cobb |
| 2003/0016452 A1 | | 1/2003 | Sayag |

(Continued)

FOREIGN PATENT DOCUMENTS

| | | |
|---|---|---|
| EP | 1410089 A1 | 4/2004 |
| GB | 2399654 A | 9/2004 |

(Continued)

OTHER PUBLICATIONS

International Search Report and Written Opinion dated May 25, 2021 issued in PCT/JP2021/009600, with partial translation.

*Primary Examiner* — John P Leubecker
(74) *Attorney, Agent, or Firm* — Scully, Scott, Murphy & Presser, P.C.

(57) ABSTRACT

An objective optical system including a first lens and a second lens that are arranged in this order from an object side along a main optical axis, wherein the first lens has a partially spherical shape having a first flat surface, the second lens has a partially spherical shape having a second flat surface, the first flat surface is disposed on a side of the object and is inclined with respect to the main optical axis, and the second flat surface is disposed on an opposite side which is opposite from the side of the object and is perpendicular to the main optical axis.

20 Claims, 16 Drawing Sheets

(56) References Cited

U.S. PATENT DOCUMENTS

| | | |
|---|---|---|
| 2003/0233029 A1 | 12/2003 | Alekseenko et al. |
| 2004/0133071 A1 | 7/2004 | Alekseenko et al. |
| 2004/0263994 A1 | 12/2004 | Sayag |
| 2009/0269009 A1* | 10/2009 | Tanaka .................. G02B 7/027 385/39 |
| 2010/0238559 A1* | 9/2010 | Tanaka .................. G02B 6/327 359/811 |
| 2013/0100546 A1 | 4/2013 | Okano |
| 2015/0346463 A1* | 12/2015 | Fussy ..................... G02B 9/02 348/14.08 |
| 2017/0333151 A1* | 11/2017 | Maholtra ............... A61B 90/30 |
| 2019/0223700 A1* | 7/2019 | Elmaanaoui ............ A61B 1/07 |
| 2020/0297203 A1 | 9/2020 | Togino |
| 2021/0080328 A1* | 3/2021 | Liu ........................ G01J 5/046 |
| 2021/0145253 A1 | 5/2021 | Miki et al. |
| 2021/0321859 A1 | 10/2021 | Mori et al. |

FOREIGN PATENT DOCUMENTS

| | | |
|---|---|---|
| JP | S59166219 U | 11/1984 |
| JP | H05297269 A | 11/1993 |
| JP | 2001124990 A | 5/2001 |
| JP | 2004287435 A | 10/2004 |
| JP | 2007515211 A | 6/2007 |
| JP | 2009134305 A | 6/2009 |
| JP | 2011104239 A | 6/2011 |
| JP | 2012008489 A | 1/2012 |
| WO | 2005053519 A1 | 6/2005 |
| WO | 2019111360 A1 | 6/2019 |
| WO | WO 2019/212960 * | 11/2019 |
| WO | 2020008613 A1 | 1/2020 |
| WO | 2020141568 A1 | 7/2020 |

\* cited by examiner

OBJECTIVE OPTICAL SYSTEM, OPTICAL UNIT, AND ENDOSCOPE APPARATUS WITH LENSES OF PARTIALLY SPHERICAL SHAPE

CROSS-REFERENCE TO RELATED APPLICATIONS

This is a continuation of International Application PCT/JP2021/009600, with an international filing date of Mar. 10, 2021, which is hereby incorporated by reference herein in its entirety.

TECHNICAL FIELD

The present invention relates to an objective optical system, an optical unit, and an endoscope apparatus.

BACKGROUND ART

In the related art, there is a known endoscope including a spherical lens in a distal-end portion of an inserted portion (for example, see PTL 1). A spherical lens is suitable for an ultra-fine endoscope, because manufacturing and miniaturization thereof are easy.

CITATION LIST

Patent Literature

{PTL 1} International Publication No. WO 2020/141568

SUMMARY OF INVENTION

A first aspect of the present invention is an objective optical system including: a first lens and a second lens that are arranged in this order from an object side along a main optical axis, wherein: the first lens has a partially spherical shape having a first flat surface; the second lens has a partially spherical shape having a second flat surface; the first flat surface is disposed on a side of the object and is inclined with respect to the main optical axis; and the second flat surface is disposed on an opposite side which is opposite from the side of the object and is perpendicular to the main optical axis.

A second aspect of the present invention is an optical unit including: a cylindrical holding member; and the above objective optical system that is held in an interior of the holding member, wherein the first lens and the second lens are arranged in a longitudinal direction of the holding member, a first end surface, which is located at a first lens side, of the holding member has a flat inclined portion disposed on a flat surface that is same as the first flat surface, and a second end surface, which is located at a second lens side, of the holding member is disposed on a flat surface that is same as the second flat surface or that is located at a side of the first lens relative to the second flat surface.

A third aspect of the present invention is an endoscope apparatus including the above-described objective optical system.

DESCRIPTION OF EMBODIMENTS

First Embodiment

An objective optical system according to a first embodiment of the present invention will be described with reference to the drawings.

Figure 1A:
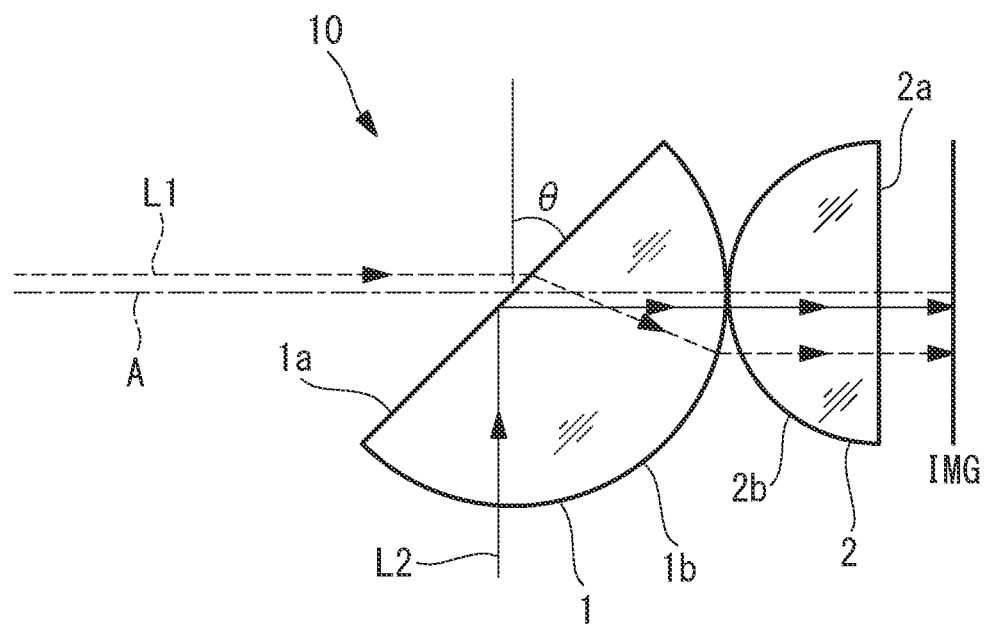
FIG. 1A is a configuration diagram of an objective optical system according to a first embodiment.

As shown in FIG. 1A, an objective optical system 10 according to this embodiment includes a first lens 1 and a second lens 2 that are sequentially arranged from an object side along a main optical axis A. In FIG. 1A, the left side of the objective optical system 10 is the object side, and the right side of the objective optical system 10 is the image side.

The first lens 1 and the second lens 2 have partially spherical shapes in which a portion of a sphere is removed.

Specifically, the first lens 1 has a spherical segment shape in which a sphere is cut along a single flat surface, and an outer surface of the first lens 1 consists of a first flat surface 1a and a first convex spherical surface 1b. The first flat surface 1a is an inclined polished surface inclined with respect to the main optical axis A and is disposed on the object side.

The second lens 2 has a spherical segment shape in which a sphere is cut along a single flat surface, and an outer surface of the second lens 2 consists of a second flat surface 2a and a second convex spherical surface 2b. The second flat surface 2a is perpendicular to the main optical axis A and is disposed on the image side, which is the opposite side from the object side.

The center of curvature of the first convex spherical surface 1b and the center of curvature of the second convex spherical surface 2b are disposed on the main optical axis A.

Figure 2A:
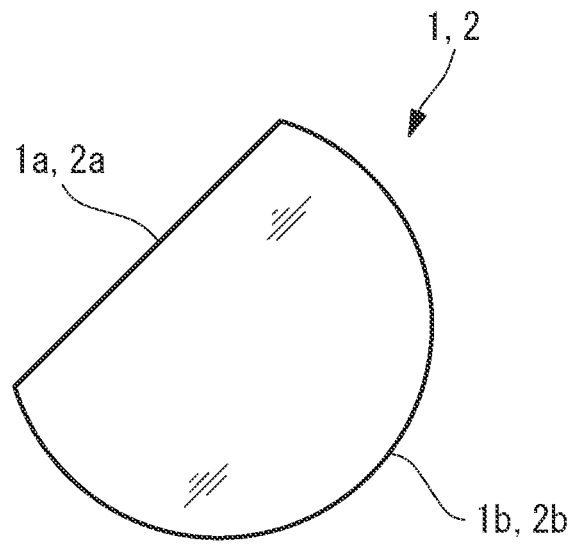
FIG. 2A is a diagram showing a modification of the shapes of a first lens and a second lens.
Figure 2B:
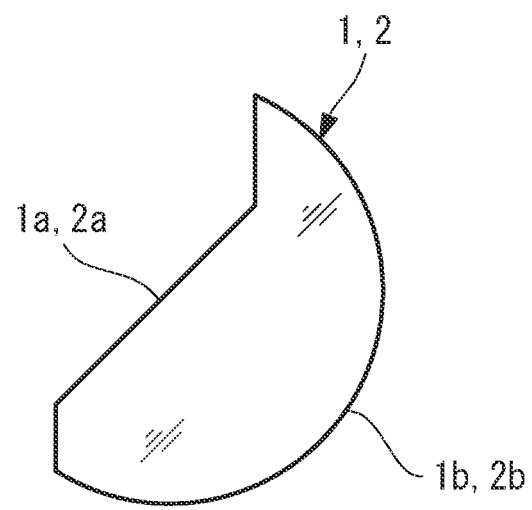
FIG. 2B is a diagram showing another modification of the shapes of the first lens and the second lens.

Although the lenses 1 and 2 shown in FIG. 1A have a hemispherical shape, each of the lenses 1 and 2 may have a partially spherical shape other than the hemispherical shape. For example, each of the lenses 1 and 2 may have a spherical segment shape in which a sphere is cut along a single flat surface at a position shifted from the center thereof or a hyper hemispherical shape, as shown in FIG. 2A. In addition, as shown in FIG. 2B, each of the lenses 1 and 2 may have a partially spherical shape in which a sphere is cut along a plurality of flat surfaces. In addition, although it is preferable that the convex spherical surfaces 1b and 2b be a spherical surface having a completely uniform curvature, said surfaces may be substantially spherical surfaces in which the curvature is not completely uniform due to causes such as manufacturing errors.

Among light beams that enter, in the air or in a liquid, the second lens 2 and the first lens 1 from the image side in parallel to the main optical axis A, some are refracted at the first flat surface 1a and the others are totally reflected at the first flat surface 1a. The refracted light beams exit from the first flat surface 1a in a forward direction of the objective optical system 10. The totally reflected light beams exit from the first convex spherical surface 1b in a lateral direction of the objective optical system 10. Specifically, as a result of providing the first flat surface 1a inclined with respect to the main optical axis A, an image is formed on an image surface IMG on the image side of the second lens 2 by both of a light beam L1 that has entered the objective optical system 10 from the front direction and a light beam L2 that has entered the objective optical system 10 from the lateral direction. In FIG. 1A, the light beam L1 entering from the front direction is indicated by the broken line and the light beam L2 entering from the lateral direction is indicated by the solid line.

Next, the function of the objective optical system 10 will be described.

Figure 1B:
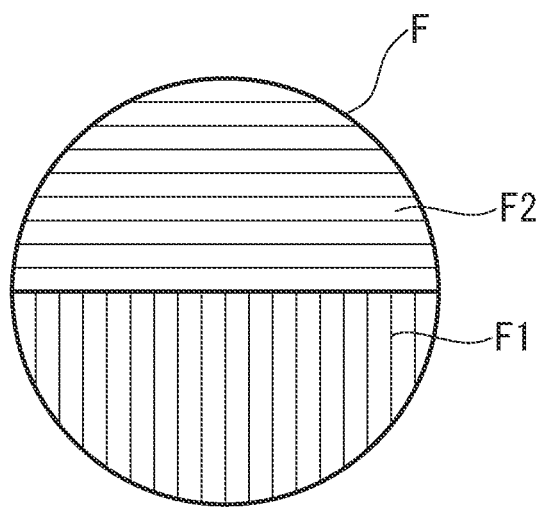
FIG. 1B is a diagram showing an example of a viewing field of the objective optical system in FIG. 1A.

FIG. 1B shows an example of a viewing field F of the objective optical system 10. As shown in FIG. 1B, the viewing field F of the objective optical system 10 includes both a forward viewing field F1 and a lateral viewing field F2.

Specifically, the light beam L1 enters the objective optical system 10 from the front side of the first lens 1 via the first flat surface 1a, and the light beam L2 enters the objective optical system 10 from the lateral direction of the first lens 1 via the first convex spherical surface 1b on the opposite side from the first flat surface 1a. The light beams L1 and L2 are focused by the first lens 1 and the second lens 2, exit from the second flat surface 2a in parallel to the main optical axis A, and form images on the image surface IMG.

Here, at the first flat surface 1a inclined with respect to the main optical axis A, the light beam L1 coming from the front direction is refracted, and the light beam L2 coming from the lateral direction is totally reflected. Accordingly, the light beam L1 coming from the front direction and the light beam L2 coming from the lateral direction travel from the first flat surface 1a to the image surface IMG through different routes and form images on the image surface IMG at different positions from each other. Specifically, as shown in FIG. 1B, a portion of the viewing field F serves as the forward viewing field F1 and the other portion of the viewing field F serves as the lateral viewing field F2. Therefore, it is possible to simultaneously observe both the front direction and the lateral direction.

In addition, the light beam L1 coming from the front direction passes through the convex spherical surfaces 1b and 2b twice in total and, the light beam L2 coming from the lateral direction passes through the convex spherical surfaces 1b and 2b three times in total. As indicated above, the number of times the light beam L2 coming from the lateral direction passes through the convex spherical surfaces 1b and 2b is one greater than the light beam L1 coming from the front direction. Consequently, the focal point of the forward viewing field F1 becomes a far point, which is advantageous for checking the forward direction, which is the direction of the forward moving of the objective optical system 10. In addition, the focal point of the lateral viewing field F2 becomes a near point, which is advantageous for observing an observation subject in detail.

In addition, as will be described later, the position of a boundary between the forward viewing field F1 and the lateral viewing field F2 on the image surface IMG changes in accordance with an inclination angle θ of the first flat surface 1a with respect to the main optical axis A. The inclination angle θ is an angle formed by an axis perpendicular to the main optical axis A and the first flat surface 1a. In other words, by adjusting the inclination angle θ, it is possible to change the area ratio between the forward viewing field F1 and the lateral viewing field F2.

In addition, the lenses 1 and 2 have a shape in which a portion of a spherical lens is cut along a flat surface. Therefore, as will be described in a second embodiment, it is possible to manufacture the objective optical system 10 by using micro spherical lenses, which are easy to manufacture and miniaturize and relatively low cost, and thus, it is possible to easily realize an ultra-fine, low-cost objective optical system 10.

For example, although it is possible to realize an ultra-fine objective optical system that is capable of simultaneously observing both a forward direction and a lateral direction by employing a combination of an ultra-fine prism and microlenses, an ultra-fine prism is expensive. The objective optical system 10 of this embodiment can be manufactured at a lower cost than an objective optical system employing an ultra-fine prism.

In this embodiment, it is preferable that the inclination angle θ of the first flat surface 1a satisfy formula (1) below:

$$A+\varphi 2-X2<\theta <90+\varphi 1-X1 \qquad (1)$$

where A, φ1, φ2, X1, and X2 satisfy formulas below; n1 is the refractive index of the first lens 1; and n2 is the refractive index of the second lens 2.

$$\sin \varphi 1=(0.8/n2)$$

$$\sin X1=0.8$$

$$\sin \varphi 2=(0.6/n2)$$

$$\sin X2=0.6$$

$$\sin A=1/n1$$

In an example, the case in which n1=n2=1.51 leads to 28°<θ<68°.

The area ratio between the forward viewing field F1 and the lateral viewing field F2 changes in accordance with the inclination angle θ, and, with an increase in the inclination angle θ, the proportion of the lateral viewing field F2 in the total viewing field F of the objective optical system 10 increases. In the case in which the proportion of the lateral viewing field F2 is excessively high, the forward viewing field F1 becomes so small that it is difficult to observe the forward viewing field F1. On the other hand, in the case in which the proportion of the lateral viewing field F2 is excessively low, the lateral viewing field F2 becomes so small that it is difficult to observe the lateral viewing field F2.

Formula (1) represents the condition for the height of an image in the lateral viewing field F2 on the image surface IMG to become 20 to 80%. As a result of the inclination angle θ satisfying formula (1), it is possible to ensure sizes that are suitable for actual use in both the forward viewing field F1 and the lateral viewing field F2.

Figure 12A:
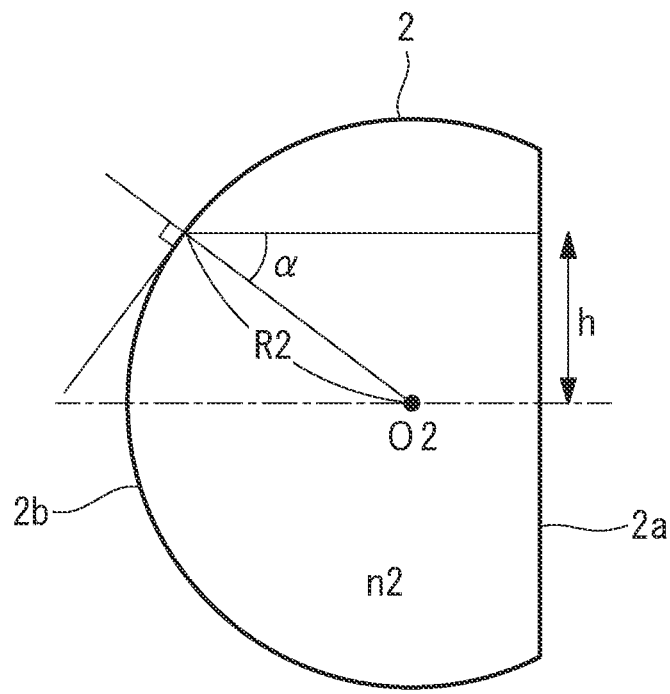
FIG. 12A is a diagram for explaining derivation of formula (1).
Figure 12B:
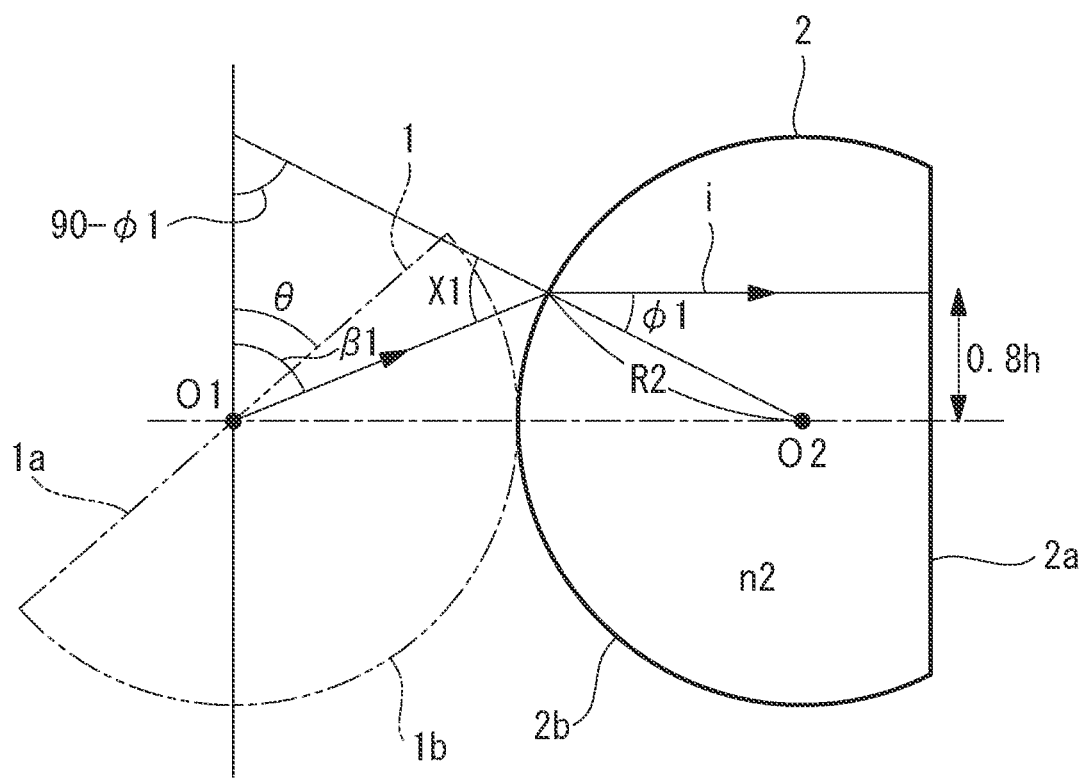
FIG. 12B is a diagram for explaining derivation of formula (1).
Figure 12C:
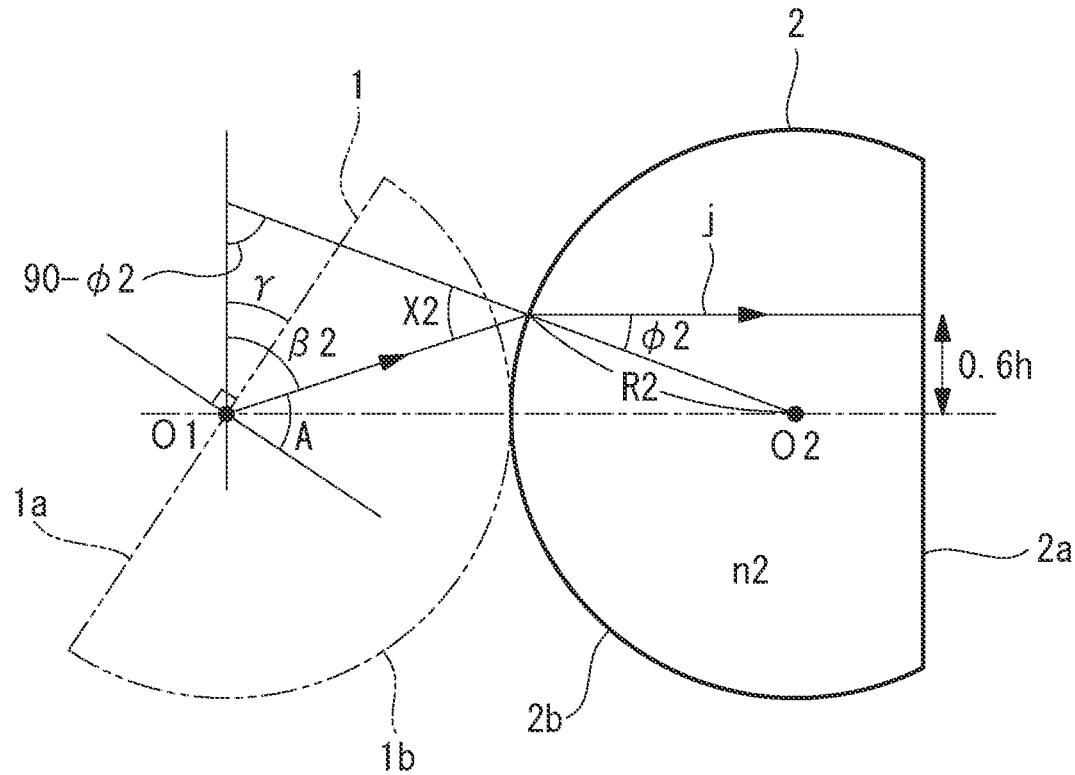
FIG. 12C is a diagram for explaining derivation of formula (1).

FIGS. 12A to 12C explain derivation of formula (1).

From n2×sin α=1 obtained from the geometric relationship indicated in FIG. 12A and the Snell's law, a maximum image height h is represented by the formula below.

$$h=\sin \alpha=R2/n2$$

Meanwhile, as shown in FIG. 12B, an inclination angle β1 in the case in which a light beam i at an 80% image height is totally reflected at the first flat surface 1a is represented by β1=90+φ1−X1, where the light beam i is assumed to pass through a center of curvature O1 of the first lens 1. From above, the right side of formula (1) is obtained. In other words, the inclination angle θ can be increased up to the inclination angle β1 of the light beam i at the 80% image height, where sin φ1=0.8/n2 and sin X1=0.8 from the geometric relationship in FIG. 12B.

As shown in FIG. 12C, an inclination angle β2 in the case in which a light beam j at a 60% image height is totally reflected at the first flat surface 1a is represented by β2=90+ φ2−X2, where the light beam j is assumed to pass through the center of curvature O1 of the first lens 1. In addition, in FIG. 12C, from the geometric relationship, A=90−β2+γ holds. From above, the left side of formula (1) is obtained. In other words, an inclination angle γ can be decreased to the inclination angle β2 of the light beam j at the 60% image height, where sin φ2=0.6/n2 and sin X2=0.6 from the geometric relationship in FIG. 12C and n1×sin A=1 from the Snell's law.

In this embodiment, the inclination angle θ may be arcsin(n0/n1), where n0 is the refractive index of an external area of the objective optical system 10, for example, the refractive index of the air.

arcsin(n0/n1) is a critical angle at which light comming from the image side parallel to the main optical axis A is totally reflected at the first flat surface 1a. By setting the inclination angle θ to be equal to the critical angle, it is possible to set the sizes of the forward viewing field F1 and the lateral viewing field F2 in the viewing field F so as to be half of the viewing field F.

In this embodiment, it is preferable that the first lens 1 and the second lens 2 satisfy formula (2) below:

{Eq. 1}

$$d \leq (R1 + R2)\left(\frac{n2}{\sqrt{n2^2 - 1}} - 1\right) \quad (2)$$

where d is a spacing between the first lens 1 and the second lens 2 on the main optical axis A, which is, specifically, a spacing between the first convex spherical surface 1b and the second convex spherical surface 2b on the main optical axis A; R1 is the radius of curvature of the first lens 1, which is, specifically, the radius of curvature of the first convex spherical surface 1b; and R2 is the radius of curvature of the second lens 2, which is, specifically, the radius of curvature of the second convex spherical surface 2b.

In the case in which the spacing d between the first lens 1 and the second lens 2 is excessively large, of the light beams that have entered from the first lens 1, light beams at high image heights cannot enter the second lens 2, and thus, the images in the viewing field F formed on the image surface IMG become small. Formula (2) represents the condition for an image to be formed on the image surface IMG as a result of a light beam with the highest image height entering the second lens 2 from the first lens 1. As a result of the spacing d satisfying formula (2), it is possible to ensure the size (angle of view) of viewing field as much as possible.

Figure 13:
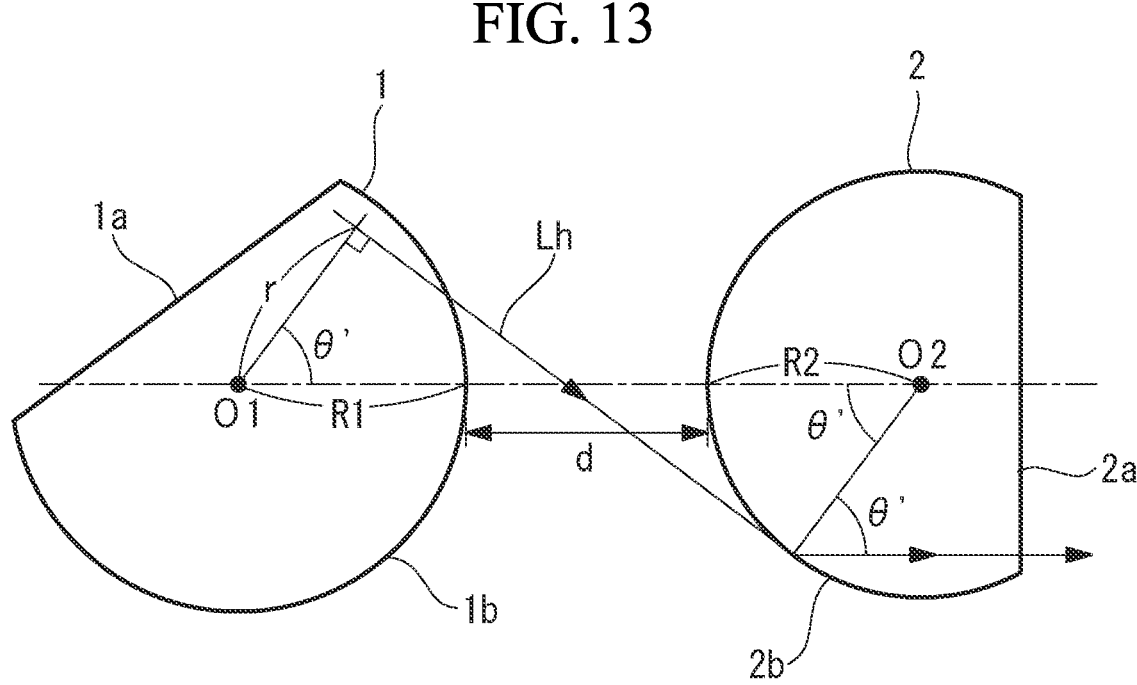
FIG. 13 is a diagram for explaining derivation of formula (2).

FIG. 13 explains formula (2) and shows, of light beams that are parallel to the main optical axis A on the image side, a route of an optical path of a light beam Lh having the highest image height. This is assumed to be the condition for the light beam Lh to reach the image surface IMG without being reflected. When this condition is met, all of light beams in the effective diameter of the second lens 2 form an image, and thus, it is possible to ensure the viewing field, that is, the angle of view, as much as possible. This condition corresponds to satisfying formula (i) in FIG. 13. When r R1, after the light beam Lh exits from the first convex spherical surface 1b, the light beam Lh enters the second lens 2 from the second convex spherical surface 2b and is made incident on the image surface IMG parallel to the main optical axis A.

$$r \leq R1 \quad (i)$$

Formula below is obtained from the geometric relationship in FIG. 13.

{Eq. 2}

$$r = \cos \theta'\left[(R1 + d) - \left(\frac{R2}{\cos\theta'} - R2\right)\right] \quad (ii)$$

Formula (iii) is obtained from formula (i) and formula (ii).

{Eq. 3}

$$d \leq (R1 + R2)\left(\frac{1}{\cos\theta'} - 1\right) \quad (iii)$$

The angle at which the light beam Lh having the maximum image height enters the second lens 2 is 90°. Therefore, formula (iv) holds from Snell's law.

$$1 \times \sin 90° = n2 \times \sin \theta' \quad (iv)$$

Formula (2) is obtained from formula (iv) and formula (iii).

Figure 3A:
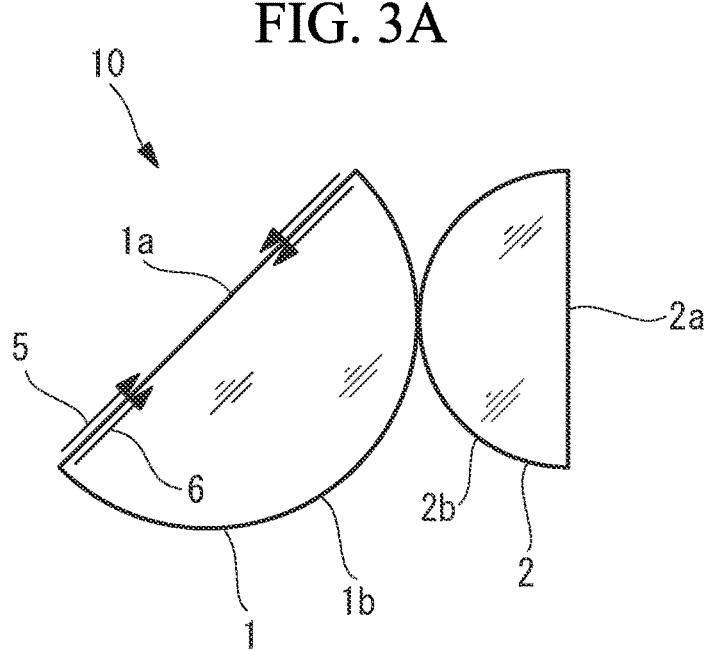
FIG. 3A is a configuration diagram of a modification of the objective optical system including an aperture.

In this embodiment, as shown in FIG. 3A, the objective optical system 10 may additionally include apertures 5 and 6 that restrict the beam diameter of light entering the first lens 1. With this configuration, it is possible to prevent unnecessary light that does not form an image from entering the objective optical system 10. Only one of the apertures 5 and 6 may be provided.

Figure 3B:
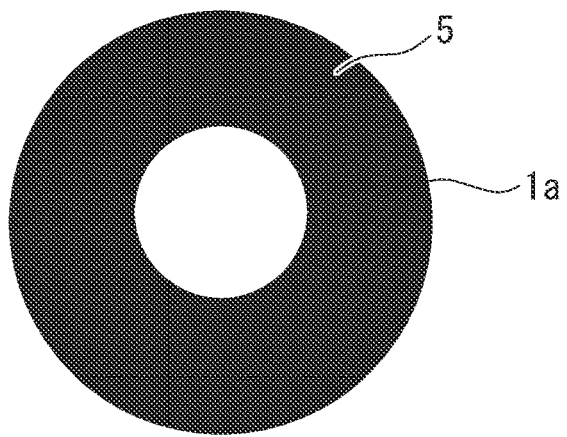
FIG. 3B is a diagram showing a front side of a first flat surface provided with the aperture.

The aperture 5 restricts the beam diameter of light entering the first lens 1 from the front direction and is disposed on the first flat surface 1a or farther on the object side than the first flat surface 1a. For example, the aperture 5 is formed by applying black paint to the first flat surface 1a, by applying surface roughening to the first flat surface 1a, or by means of a plate having a hole of an appropriate size at a center portion thereof. FIG. 3B is a diagram showing the first flat surface 1a in which the aperture 5 is formed, as viewed from outside the first lens 1.

Figure 3C:
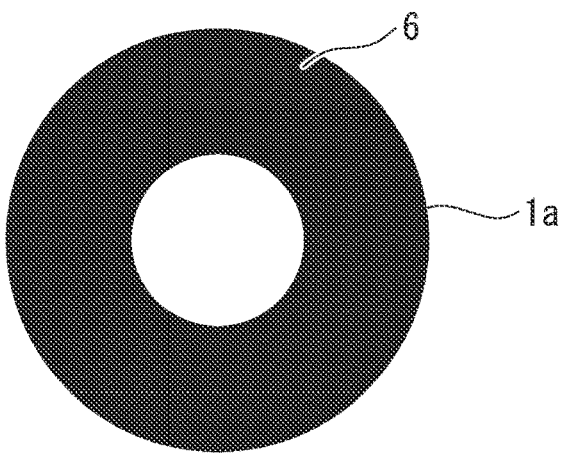
FIG. 3C is a diagram showing a back side of the first flat surface provided with the aperture.

The aperture 6 restricts the beam diameter of light entering the first lens 1 from the lateral direction and is formed by, for example, applying surface roughening to the first flat surface 1a. FIG. 3C is a diagram showing the first flat surface 1a in which the aperture 6 is formed, as viewed from inside the first lens 1.

Microfabrication or the like that limits the reflection and the transmission of light may be applied to the first flat surface 1a, and the beam diameters of light coming from both the front direction and the lateral direction may be restricted by doing so.

Next, examples of the objective optical system 10 will be described.

In the lens data of the respective examples, n1 is the refractive index of the first lens 1, n2 is the refractive index of the second lens 2, D1 is the diameter (which is, specifically, twice the radius of curvature R1 of the first convex spherical surface 1b) of the first lens 1, D2 is the diameter (which is, specifically, twice the radius of curvature R2 of the second convex spherical surface 2b) of the second lens 2, d is the spacing between the first lens 1 and the second lens 2 on the main optical axis A, and θ is the inclination angle of the first flat surface 1a with respect to the main optical axis A. The individual values are for the wavelength 586 nm.

FIGS. 4A, 5A, 6A, and 7A, which are light beam diagrams of first to fourth examples, define the brightness in a state in which the apertures are not provided. Such an objective optical system 10 without the apertures can be suitably applied to a scanning endoscope (see FIG. 10) and a fiber scope (see FIG. 11A) in which the brightness is determined by the numerical aperture of an optical fiber, and can also be suitably applied to an endoscope (see FIG. 11C) that includes a relay optical system in a subsequent stage of the objective optical system 10 and in which the brightness can be defined by an aperture of the relay optical system.

First Example

Figure 4A:
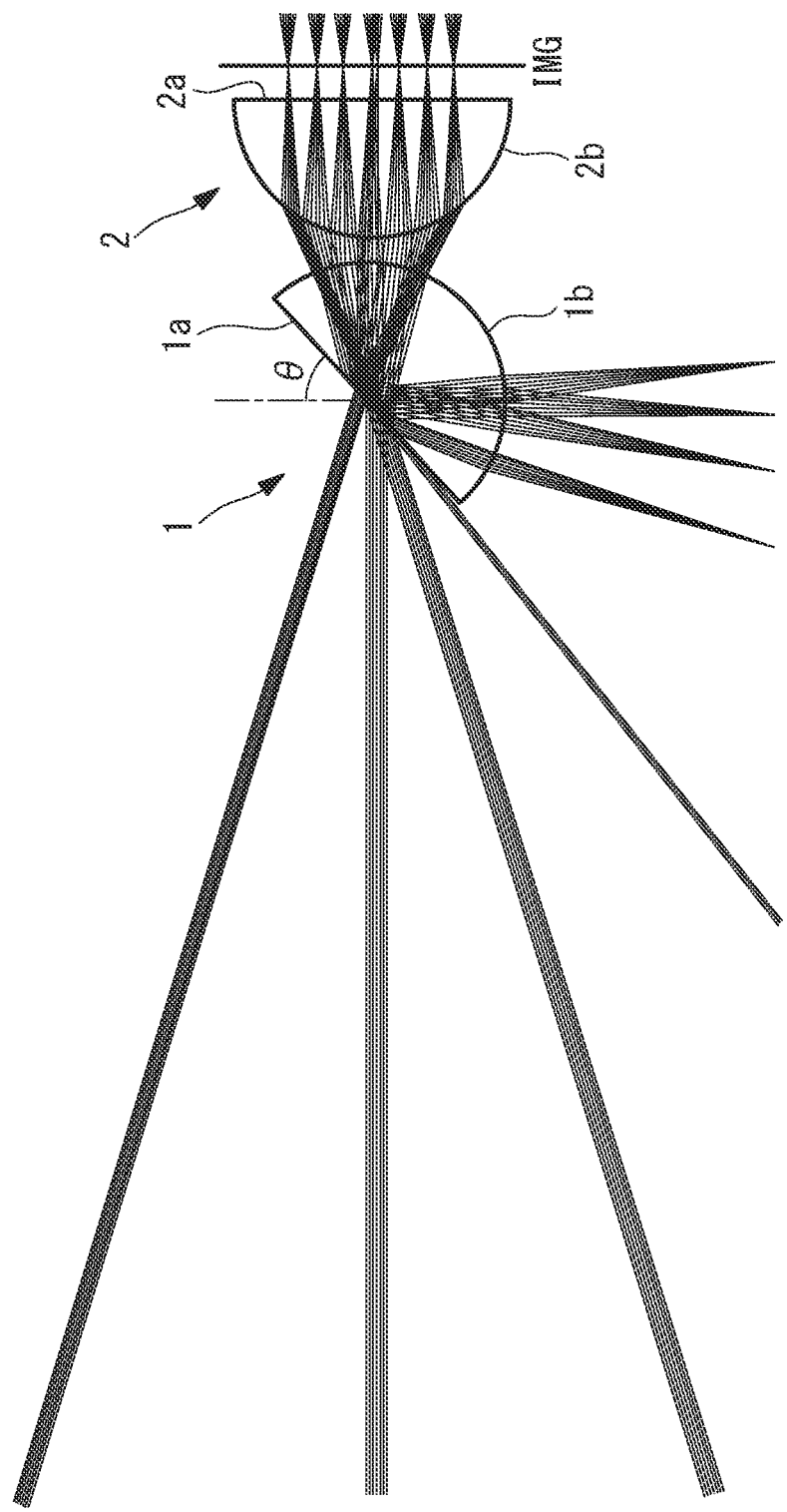
FIG. 4A is a configuration diagram of a first example of the objective optical system.

FIG. 4A shows the first example of the objective optical system 10.

Figure 4B:
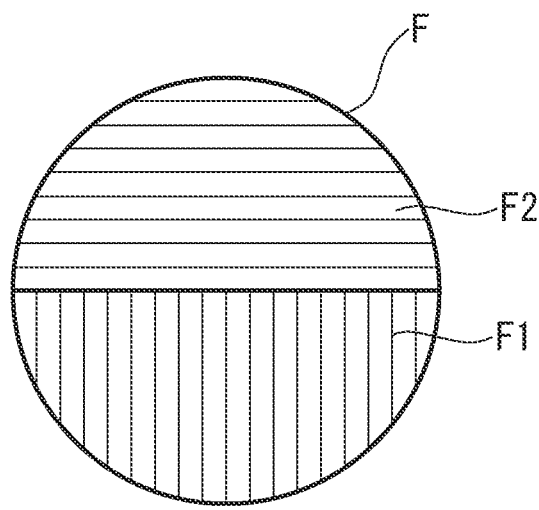
FIG. 4B is a diagram showing a viewing field of the objective optical system in FIG. 4A.

In this example, the diameter of the first lens 1 and the diameter of the second lens 2 are equal to each other. The inclination angle θ is arcsin(n0/n1) and is, specifically, 42°. Therefore, as shown in FIG. 4B, the forward viewing field F1 occupies one half of the viewing field F, and the lateral viewing field F2 occupies the other half of the viewing field F.

Note that the light beams shown in FIG. 4A indicate light beams in which the object-side telecentric NA is 0.1.

The lens data of the objective optical system of this example are as follow.
n1 1.51
n2 1.51
D1 0.5 mm
D2 0.5 mm
d 50 μm
object distance (forward direction) infinity
object distance (lateral direction) 0.48 mm
back focus 0.063 mm
θ 42°
angle of view (forward direction) +23° to −48°
angle of view (lateral direction) +16° to −6°

Second Example

Figure 5A:
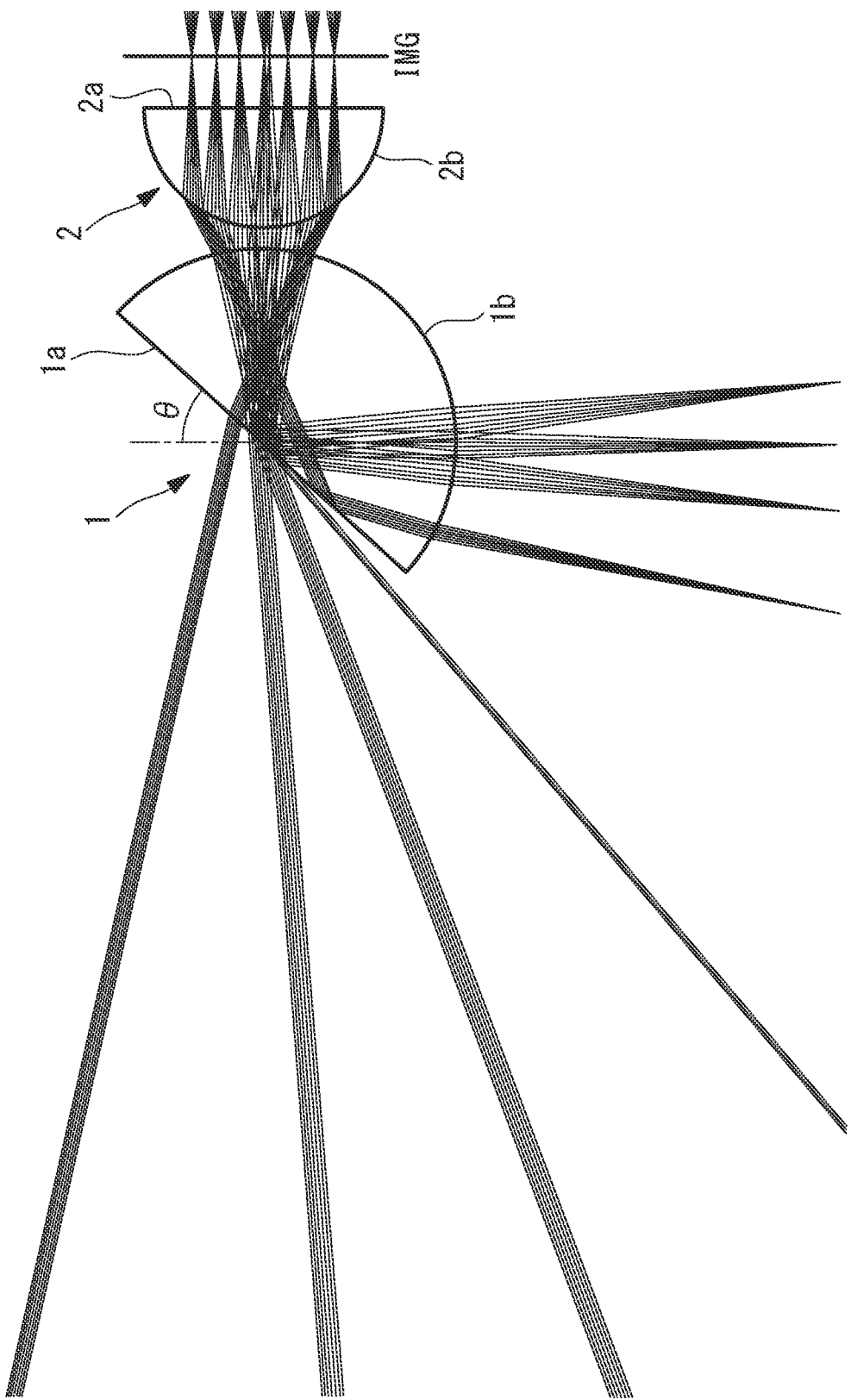
FIG. 5A is a configuration diagram of a second example of the objective optical system.

FIG. 5A shows the second example of the objective optical system 10.

Figure 5B:
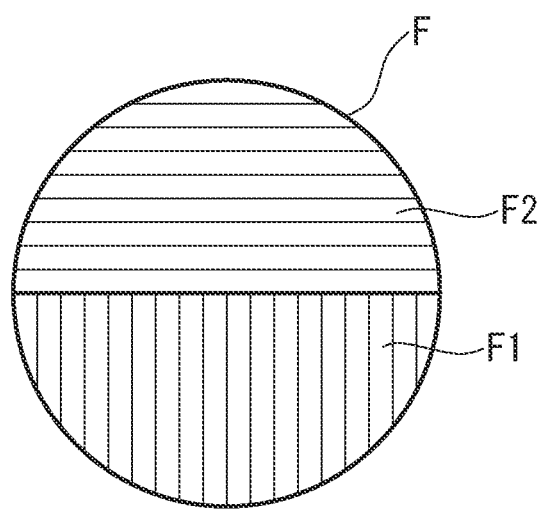
FIG. 5B is a diagram showing a viewing field of the objective optical system in FIG. 5A.

The objective optical system of this example differs from that of the first example in terms of the diameter D1 and the lateral-direction object distance of the first lens 1. Specifically, the diameter D1 of the first lens 1 and the diameter D2 of the second lens 2 differ from each other, and D1 is greater than D2. As shown in FIG. 5B, the forward viewing field F1 occupies one half of the viewing field F and the lateral viewing field F2 occupies the other half of the viewing field F, as with the first example.

The focal point positions of the respective forward viewing field F1 and lateral viewing field F2 depend on the curvatures of the convex spherical surfaces 1b and 2b. By setting the diameters D1 and D2 to be different from each other, it is possible to adjust the relationship between the forward-direction focal point position and the lateral-direction focal point position. In this example, by setting the D1 to be greater than that of the first example, the lateral-direction focal point position is designed to be farther away while maintaining the forward-direction focal point position at infinity. In accordance with design requirements, D1 may be set to be smaller than D2.

The lens data of the objective optical system of this example are as follow.
n1 1.51
n2 1.51
D1 0.8 mm
D2 0.5 mm
d 50 μm
object distance (forward direction) infinity
object distance (lateral direction) 0.80 mm
back focus 0.12 mm
θ 42°

Third Example

Figure 6A:
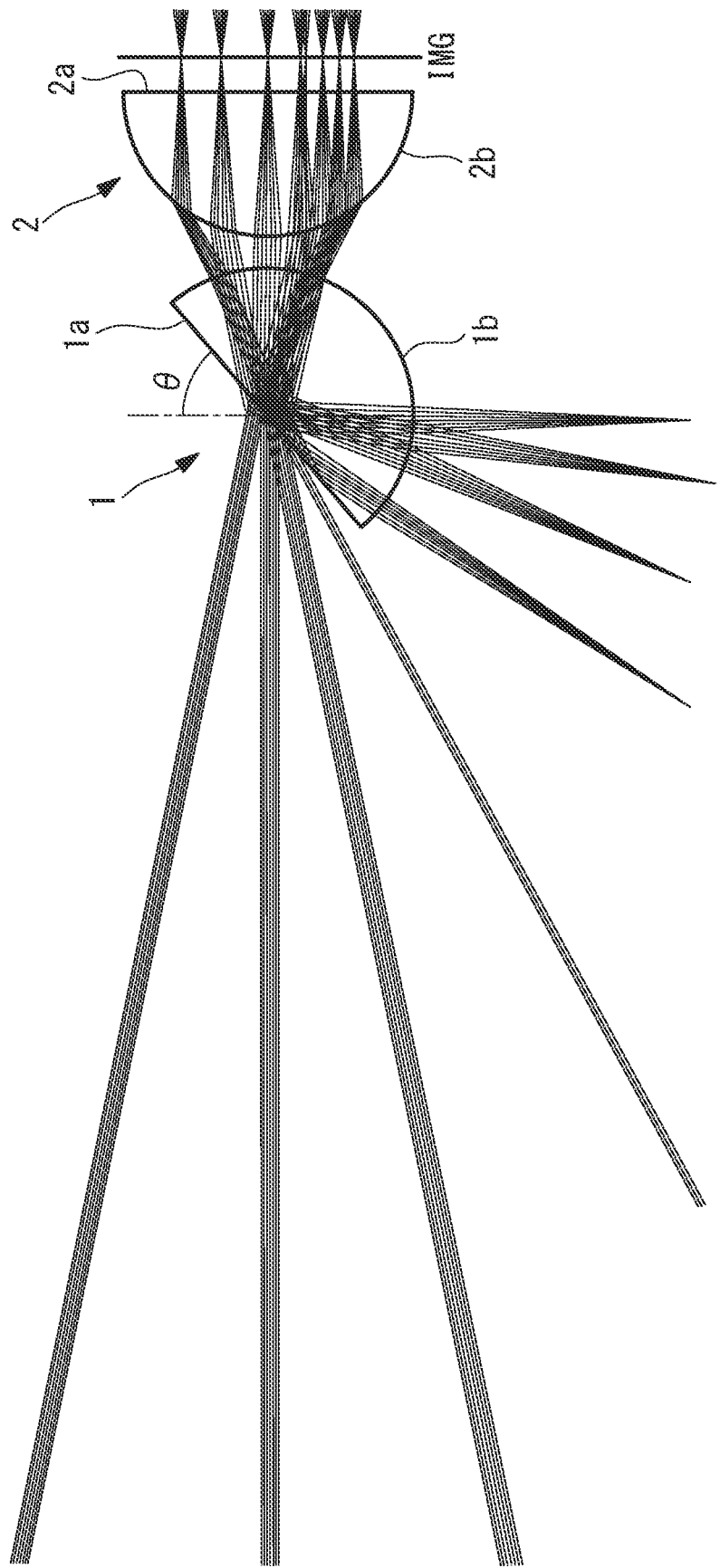
FIG. 6A is a configuration diagram of a third example of the objective optical system.

FIG. 6A shows the third example of the objective optical system 10.

Figure 6B:
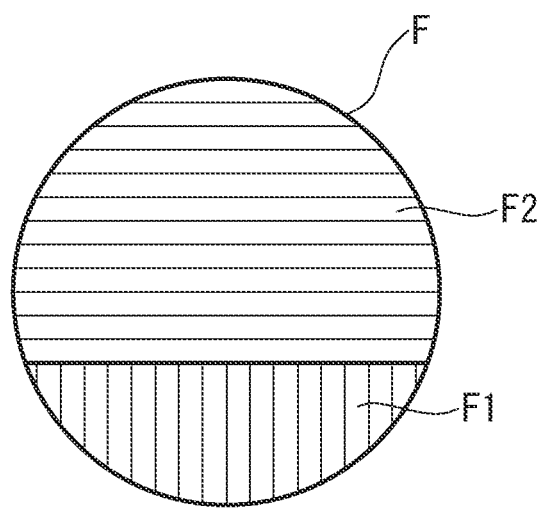
FIG. 6B is a diagram showing a viewing field of the objective optical system in FIG. 6A.

The objective optical system of this example differs from that of the first example in terms of the inclination angle θ, and the inclination angle θ is greater than the critical angle. Therefore, as shown in FIG. 6B, the proportion of the lateral viewing field F2 increases. Such an objective optical system is advantageous in the case in which a lateral direction needs to be preferentially observed. In this example, the inclination angle θ is 50° and formula (1) is satisfied.

The lens data of the objective optical system of this example are as follow.
n1 1.51
n2 1.51
D1 0.5 mm
D2 0.5 mm
d 50 μm
object distance (forward direction) infinity
object distance (lateral direction) 0.48 mm
back focus 0.063 mm
θ 50°
angle of view (forward direction) +12° to −40°
angle of view (lateral direction) +33° to 0°

Fourth Example

Figure 7A:
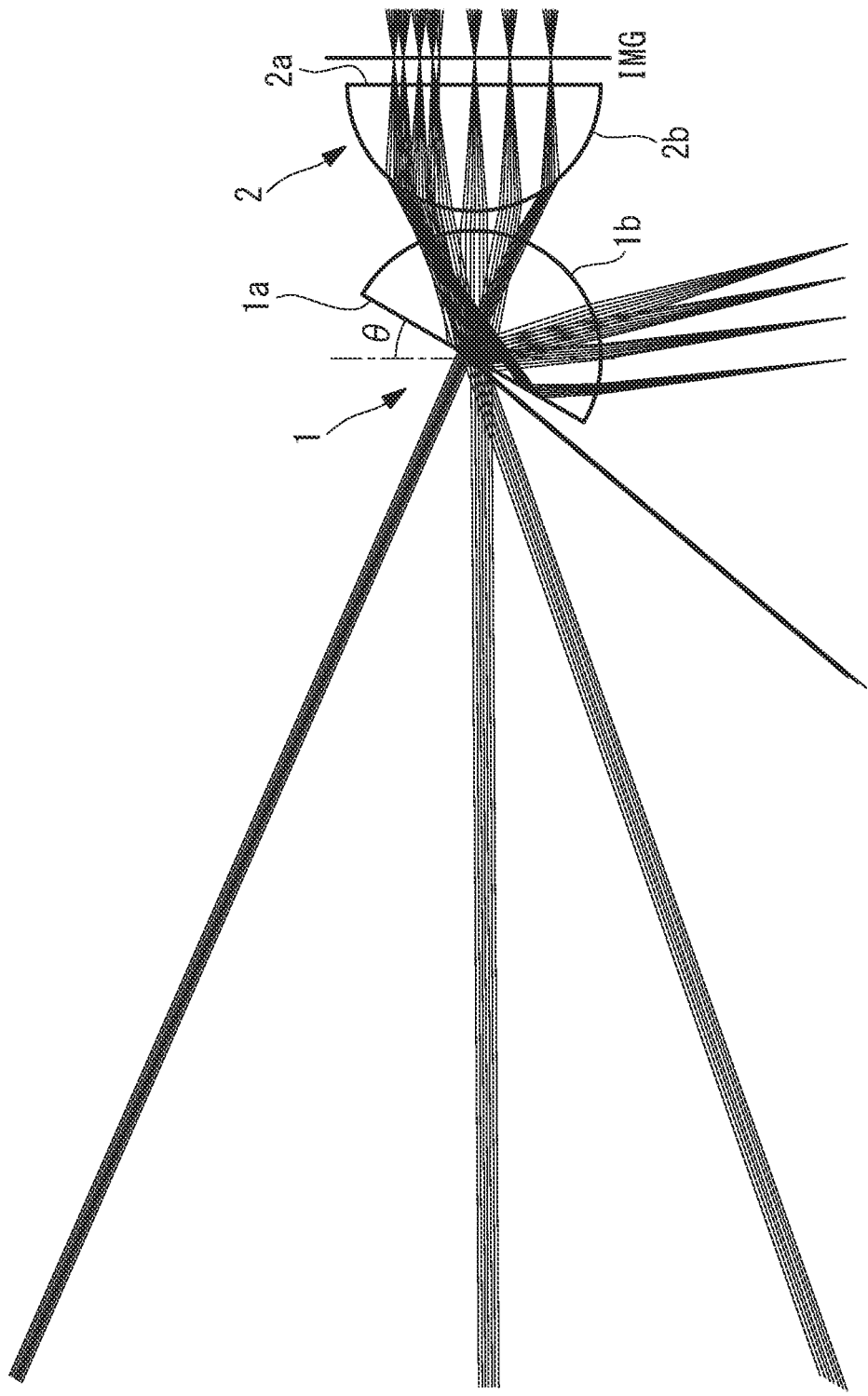
FIG. 7A is a configuration diagram of a fourth example of the objective optical system.

FIG. 7A shows the fourth example of the objective optical system 10.

Figure 7B:
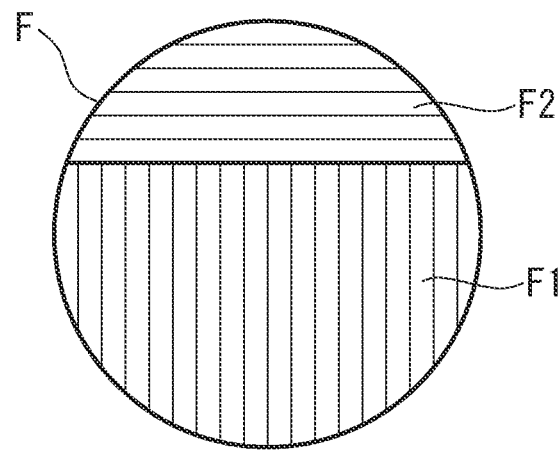
FIG. 7B is a diagram showing a viewing field of the objective optical system in FIG. 7A.

The objective optical system of this example differs from that of the first example in terms of the inclination angle θ of the first flat surface 1a, and the inclination angle θ is smaller than the critical angle. Therefore, as shown in FIG. 7B, the proportion of the forward viewing field F1 increases. Such an objective optical system is advantageous in the case in which a forward direction needs to be preferentially observed. In this example, the inclination angle θ is 30°, and formula (1) is satisfied. In addition, by setting the direction of the lateral viewing field F2 to be farther rearward, it is possible to also observe a viewing field in a diagonally rearward direction.

The lens data of the objective optical system of this example are as follow.

n1 1.51
n2 1.51
D1 0.5 mm
D2 0.5 mm
d 50 μm
object distance (forward direction) infinity
object distance (lateral direction) 0.48 mm
back focus 0.063 mm
θ 30°
angle of view (forward direction) +30° to −60°
angle of view (lateral direction) −7° to −16°

Second Embodiment

Next, an optical unit 20 according to a second embodiment of the present invention will be described with reference to the drawings. In this embodiment, configurations that are the same as those of the first embodiment will be given the same reference signs and the descriptions thereof will be omitted.

Figure 8:
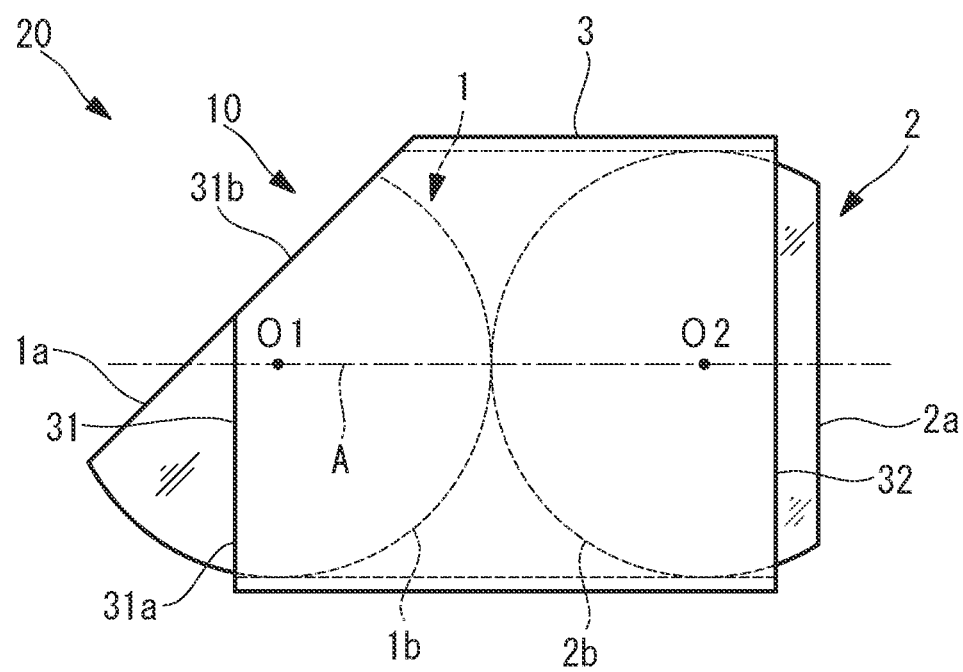
FIG. 8 is a configuration diagram of an optical unit according to a second embodiment.

As shown in FIG. 8, the optical unit 20 according to this embodiment includes the objective optical system 10 and a cylindrical holding member 3 that is open at two ends thereof.

The holding member 3 is a pipe made of a metal such as stainless steel, and is, for example, a cylindrical or rectangular tube member. The first lens 1 and the second lens 2 are held inside the objective optical system 10 and arranged in a longitudinal direction of the holding member 3, and the main optical axis A is aligned with a center axis of the holding member 3.

Outer surfaces of the respective lenses 1 and 2 are secured to an inner surface of the holding member 3 by a securing means. It is preferable that the securing means be friction between the outer surfaces of the respective lenses 1 and 2 and the inner surface of the holding member 3. In order to stably hold the respective lenses 1 and 2 by means of the friction, it is preferable that the respective lenses 1 and 2 have a hyper hemispherical shape, and centers of curvature O1 and O2 of the respective lenses 1 and 2 be disposed in the holding member 3. The securing means may be other means such as an adhesive.

The holding member 3 has a first end surface 31 disposed on a first lens 1 side and a second end surface 32 disposed on a second lens 2 side.

The first end surface 31 is disposed farther on the second lens 2 side than the end of the first lens 1 on the object side, and a portion of the first lens 1 on the object side protrudes from the first end surface 31 to the exterior of the holding member 3. The first end surface 31 has a perpendicular portion 31a that is perpendicular or substantially perpendicular to the main optical axis A and a flat inclined portion 31b that is inclined with respect to the main optical axis A. Therefore, the holding member 3 has a shape in which one side of the inclined portion 31b is removed. The inclined portion 31b is disposed on the same flat surface as the first flat surface 1a.

The second end surface 32 is perpendicular or substantially perpendicular to the main optical axis A and is disposed on the same flat surface as the second flat surface 2a or disposed farther on the first lens 1 side than the second flat surface 2a.

In one example, the optical unit 20 is manufactured by means of a manufacturing method described below.

First and second spherical lenses that have a completely spherical shape and a single cylindrical pipe that is open at two ends thereof are prepared. The first spherical lens and the second spherical lens are respectively pre-processing members for the first lens 1 and the second lens 2, and the pipe is a pre-processing member for the holding member 3. Two end surfaces of the pipe are ring-like flat surfaces that are perpendicular to or substantially perpendicular to a longitudinal direction of the pipe.

Next, the first and second spherical lenses are inserted into the interior of the pipe, the first spherical lens is positioned at a position at which a portion of the first spherical lens protrudes from one of the end surfaces of the pipe, the second spherical lens is positioned at a position at which a portion of the second spherical lens protrudes from the other end surface of the pipe, and the first and second spherical lenses are secured to the pipe.

Next, one of the end sections of the pipe and the first spherical lens are diagonally polished with respect to the main optical axis A, and the first flat surface 1a and the inclined portion 31b are formed. In addition, the second spherical lens is polished so as to be perpendicular to the main optical axis A, and the second flat surface 2a is formed. As above, the optical unit 20 is manufactured.

As has been described above, the flat surfaces 1a and 2a are formed after the spherical lenses are inserted into the pipe and secured to the pipe. Specifically, because the spherical lenses do not have directionality, it is not necessary to adjust the orientation of the spherical lenses with respect to the pipe when the spherical lenses are inserted into the pipe and secured thereto, and it is possible to insert the spherical lenses into the pipe in an arbitrary orientation and secure said lenses thereto. Accordingly, it is possible to easily assemble the two spherical lenses and the pipe, and it is possible to simplify the manufacturing method for the optical unit 20.

In order to further simplify the assembly of the optical unit 20, it is preferable that the respective lenses 1 and 2 be secured to the holding member 3 by being press fitted into the holding member 3. In order to enable the securing of the lenses 1 and 2 by means of press fitting, it is preferable that the diameters of the respective lenses 1 and 2 be equal to or more than the inner diameter of the holding member 3.

Furthermore, it is more preferable that the diameters of the lenses 1 and 2 and the inner diameter of the holding member 3 satisfy formula (3) below:

$$0.8 Db < Dc \leq Da \tag{3}$$

where Da is the smaller one of the diameter D1 of the first lens 1 and the diameter D2 of the second lens 2; Db is the larger one of the diameter D1 of the first lens 1 and the diameter D2 of the second lens 2; the holding member 3 is a cylinder having a circular cross-section in a direction perpendicular to the main optical axis A; and Dc is the inner diameter of the holding member 3.

In the case in which the diameter D1 and the diameter D2 are equal to each other (in other words, in the case in which D1=D2=Da=Db), formula (3) is rewritten as formula (3').

$$0.8Da < Dc \leq Da \quad (3')$$

By satisfying formula (3), it is possible to reliably generate, between the respective lenses 1 and 2 and the holding member 3, friction required to secure the lenses 1 and 2 while making it possible to press fit the lenses 1 and 2 in the holding member 3. In the case in which Dc is equal to or less than 0.8 Db, press fitting of the larger one of the lenses 1 and 2 in the holding member 3 may become difficult. In the case in which Dc is greater than Da, it is difficult to generate, between the smaller one of the lenses 1 and 2 and the holding member 3, friction required for the securing thereof. In addition, in the case in which Da is equal to or less than 0.8 Db, the difference between the diameters of the two lenses 1 and 2 becomes excessively large, and it is difficult to secure the two lenses 1 and 2 to the holding member 3 having a uniform inner diameter Dc by means of press fitting.

Figure 9A:
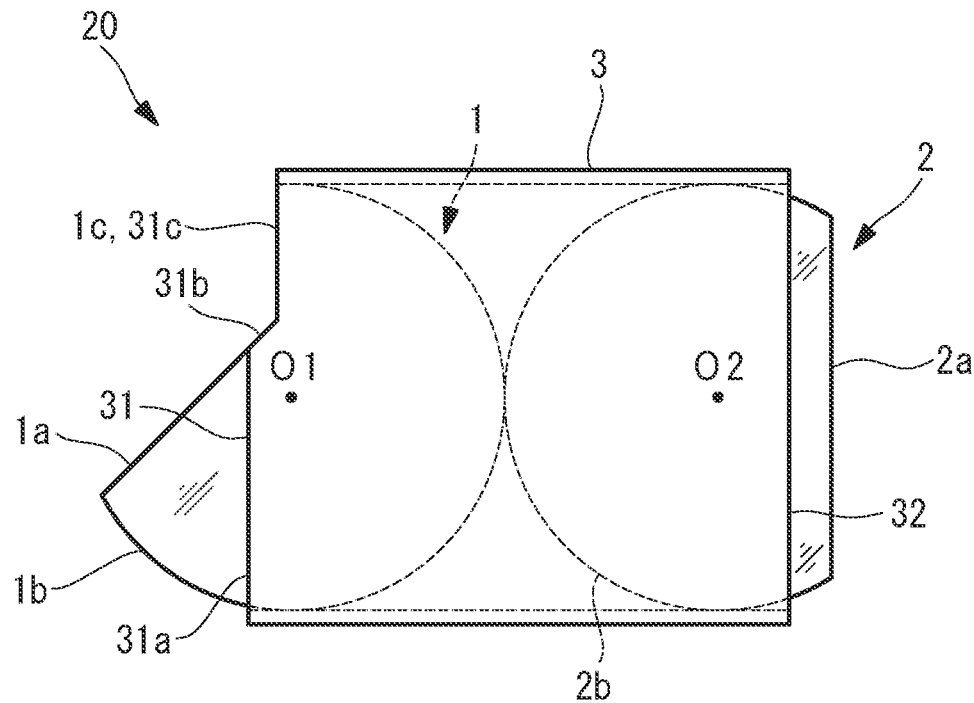
FIG. 9A is a configuration diagram of a modification of the optical unit.
Figure 9B:
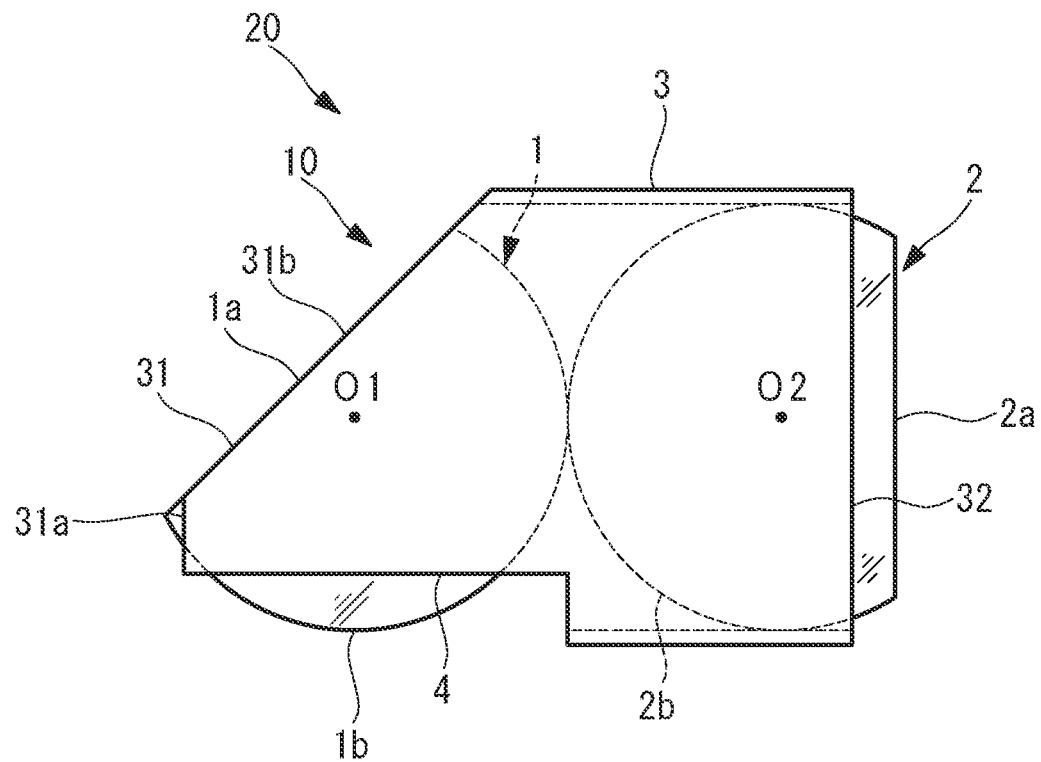
FIG. 9B is a configuration diagram of another modification of the optical unit.

In this embodiment, the shapes of the lenses 1 and 2 and the holding member 3 may be changed within ranges that do not affect light beams that form images. FIGS. 9A and 9B show modifications of the optical unit 20.

In FIG. 9A, in a region through which light beams that form images do not pass, the first lens 1 has another flat surface 1c and the first end surface 31 has another flat surface 31c. The flat surfaces 1c and 31c are perpendicular or substantially perpendicular to the main optical axis A and are positioned farther on the object side than the center O1 of the first lens 1. With this configuration, the entire circumference of the outer surface of the first lens 1 comes into contact with an inner circumferential surface of the holding member 3 and is secured thereto; therefore, it is possible to further enhance the holding power of the first lens 1 with respect to the holding member 3.

In FIG. 9B, the holding member 3 is provided with a lateral viewing window 4 through which light traveling toward the first convex spherical surface 1b from a lateral direction passes is provided. By providing the window 4, it is possible to prevent reflection of light traveling toward the first convex spherical surface 1b from a diagonally rearward direction.

Third Embodiment

Next, an endoscope apparatus according to a third embodiment of the present invention will be described with reference to the drawings. In this embodiment, configurations that are the same as those of the first and second embodiments will be given the same reference signs and the descriptions thereof will be omitted.

Figure 10:
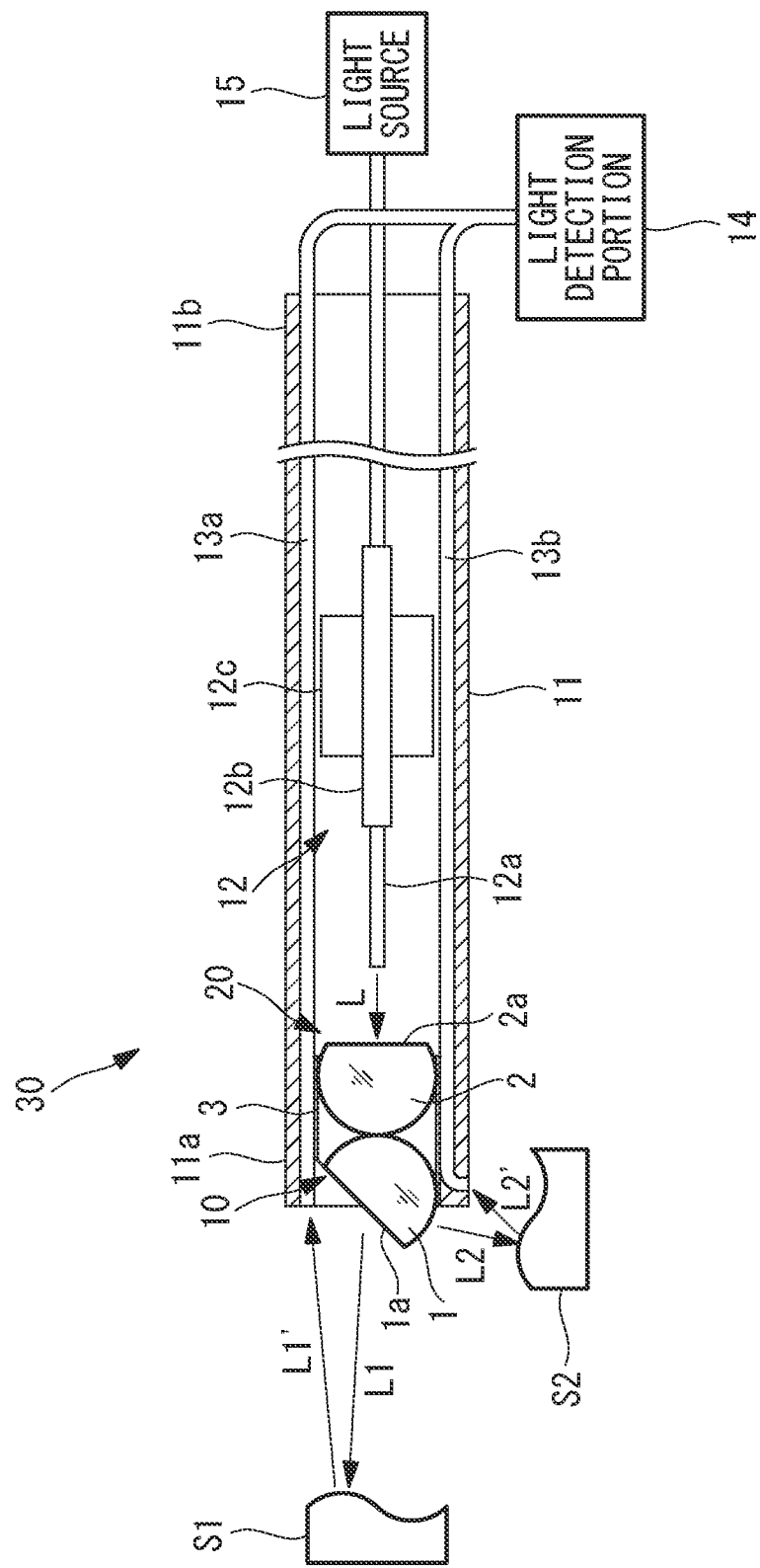
FIG. 10 is a configuration diagram of an endoscope apparatus according to a third embodiment.

As shown in FIG. 10, an endoscope apparatus 30 according to this embodiment is a light-scanning endoscope apparatus that scans illumination light beams L1 and L2 on imaging subjects S1 and S2 by means of vibration of a distal end of an optical fiber 12a.

The endoscope apparatus 30 includes: an elongated inserted portion 11 having a distal-end portion 11a and a basal-end portion 11b; a light-guide optical system 12 that guides, toward the distal-end portion 11a, an illumination light beam L output from a light source 15; the optical unit 20 disposed in the distal-end portion 11a; optical waveguides 13a and 13b that extend from the distal-end portion 11a toward the basal-end portion 11b, receive observation light beams L1' and L2' coming from an imaging subject S, and guide the observation light beams L1' and L2'; and a light detection portion 14 that detects the observation light beams L1' and L2' guided by the optical waveguides 13a and 13b.

The light-guide optical system 12 has the optical fiber 12a and a scanner 12b. The reference sign 12c is a member that holds the optical fiber 12a and the scanner 12b and secures said components to the inserted portion 11. The optical fiber 12a is disposed in the inserted portion 11 and extends along the longitudinal direction of the inserted portion 11. A basal end of the optical fiber 12a is connected to the laser light source 15 disposed outside the inserted portion 11 and a laser light beam output from the laser light source 15 is input to the basal end of the optical fiber 12a so as to serve as the illumination light L.

The scanner 12b scans, by causing a distal-end portion of the optical fiber 12a to vibrate in a direction intersecting the longitudinal direction of the optical fiber 12a, the illumination light L that exits from a distal end of the optical fiber 12a along a prescribed scanning trajectory. The scanning trajectory is, for example, spiral-like, raster-like, or Lissajous-like. The scanner 12b is, for example, a piezoelectric actuator that causes the distal-end portion of the optical fiber 12a to vibrate by expansion and contraction of a piezoelectric element or an electromagnetic actuator that causes the distal-end portion of the optical fiber 12a to vibrate by a magnetic force. As the light-guide optical system 12, a method for scanning the illumination light L by means of a galvanometer mirror may be employed.

The objective optical system 10 of the optical unit 20 serves as an illumination optical system that irradiates the illumination light L guided by the light-guide optical system 12 onto the imaging subjects S1 and S2. The illumination light L that exits from the distal end of the optical fiber 12a passes through the objective optical system 10, said light is branched into the two illumination light beams L1 and L2 at the first flat surface 1a, the illumination light beam L1 is irradiated onto the forward-direction imaging subject S1, and the illumination light beam L2 is irradiated onto the lateral-direction imaging subject S2.

The optical waveguides 13a and 13b are light-receiving optical systems that respectively receive the observation light beams L1' and L2' and are optical fibers that extend from the distal-end portion 11a to the basal-end portion 11b. The optical fiber 13a for the forward direction receives, at a distal-end surface of the inserted portion 11, the observation light beam L1' coming from the forward-direction imaging subject S1 and guides the observation light beam L1' toward the basal-end portion 11b. The optical fiber 13b for the lateral direction receives, at a lateral surface of the distal-end portion 11a, the observation light beam L2' coming from the lateral-direction imaging subject S2 and guides the observation light beam L2' toward the basal-end portion 11b.

The light detection portion 14 has a light-receiving element, such as a photodiode, and detects, by means of the light-receiving element, the intensities of the observation light beams L1' and L2' that exit from basal ends of the optical fibers 13a and 13b. The information about the intensities of the observation light beams L1' and L2' detected by the light-receiving element is transmitted to an image processing device (not shown).

The image processing device forms a two-dimensional endoscope image including the forward-direction imaging subject S1 and the lateral-direction imaging subject S2 on the basis of the irradiation positions of the illumination light beams L1 and L2 and the intensities of the observation light beams L1' and L2'. Specifically, the image processing device forms an image of the imaging subject S1, which is a portion of the endoscope image, by associating the position of the illumination light beam L1 in the scanning trajectory and the intensity of the observation light beam L1' with each other. In addition, the image processing device forms an image of the imaging subject S2, which is the other portion of the endoscope image, by associating the position of the illumination light beam L2 in the scanning trajectory and the intensity of the observation light beam L2' with each other. The endoscope image is displayed on a display (not shown).

As has been described above, with the endoscope apparatus according to this embodiment, the objective optical system simultaneously illuminates both the forward-direction and lateral-direction viewing fields with the illumination light beams L1 and L2, the illumination light beams L1 and L2 are simultaneously scanned on the forward-direction and lateral-direction imaging subjects S1 and S2, and thus, it is possible to simultaneously observe both the forward-direction and lateral-direction viewing fields.

In addition, as a result of including the objective optical system 10 as an illumination optical system, it is possible to easily realize an ultra-fine, low-cost inserted portion 11 while making it possible to simultaneously observe both the forward direction and the lateral direction.

Figure 11A:
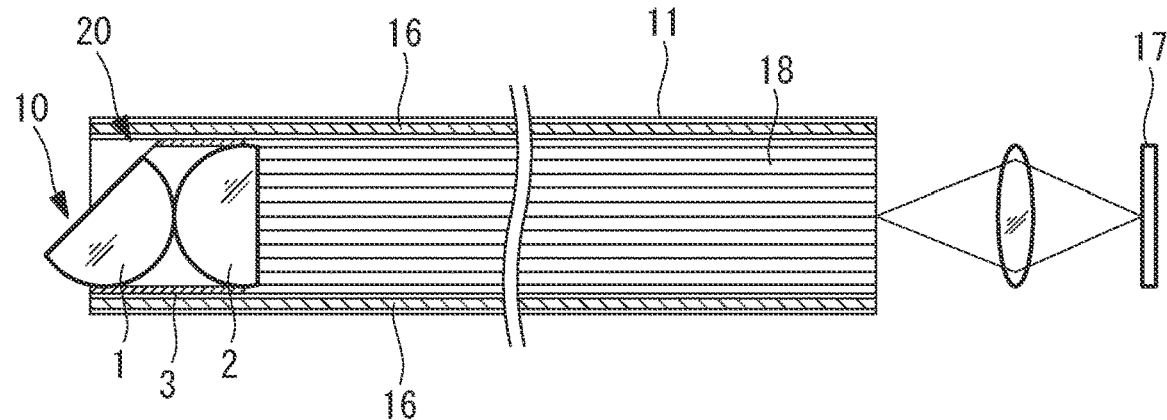
FIG. 11A is a configuration diagram of a first modification of the endoscope apparatus.
Figure 11B:
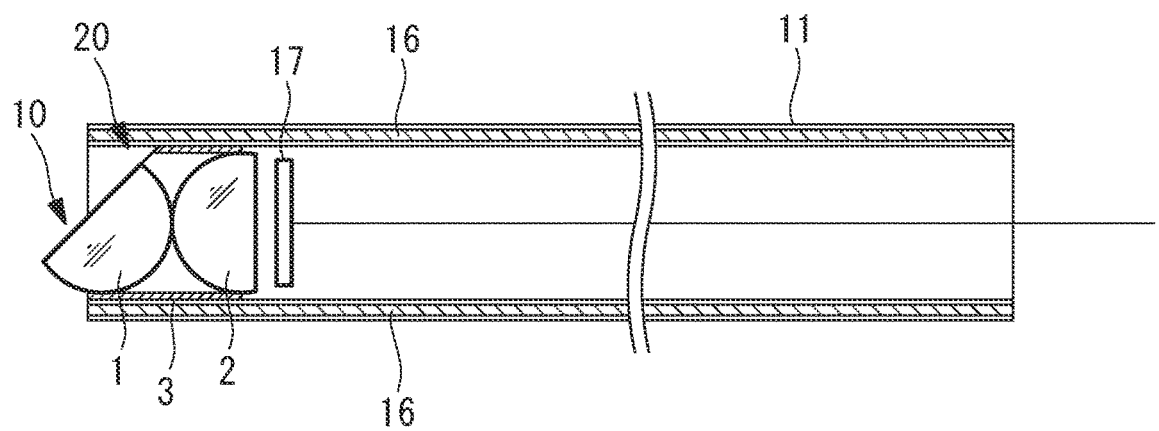
FIG. 11B is a configuration diagram of a second modification of the endoscope apparatus.
Figure 11C:
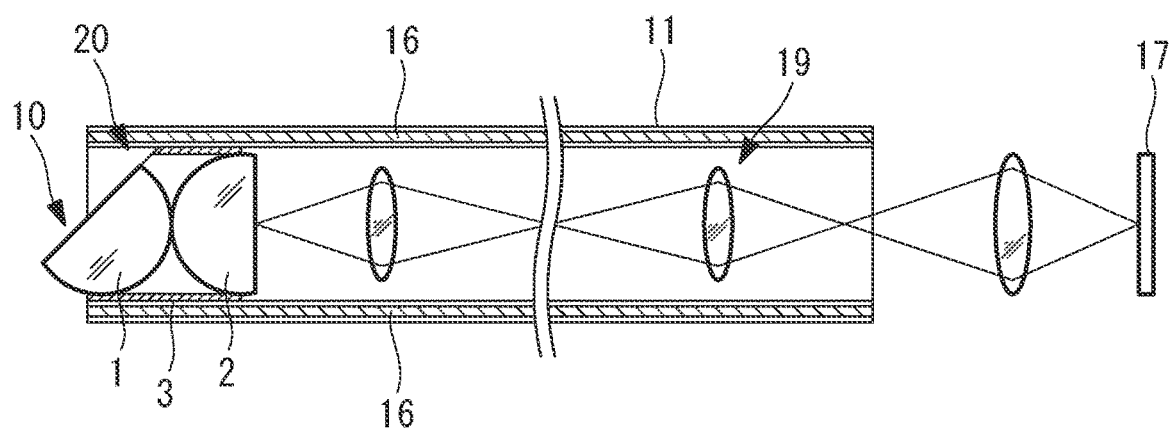
FIG. 11C is a configuration diagram of a third modification of the endoscope apparatus.

In this embodiment, although the light-scanning endoscope apparatus has been described as an application example of the objective optical system 10 and the optical unit 20, the objective optical system 10 and the optical unit 20 can be applied to other types of endoscope apparatus. FIGS. 11A to 11C show other examples of the endoscope apparatus. In FIGS. 11A to 11C, the objective optical system 10 is for receiving observation light beams and is additionally provided with an illumination optical system 16 for illuminating the forward-direction and lateral-direction viewing fields with illumination light beams. The illumination optical system 16 is formed from, for example, a plurality of illumination optical fibers that extend from a basal end of the inserted portion 11 to a distal end thereof.

The endoscope apparatus in FIG. 11A includes, as an optical system that transmits an image from the objective optical system 10 to an imaging element 17, an optical fiber bundle 18 that extends over substantially the entire length of the inserted portion 11.

The endoscope apparatus in FIG. 11B includes the imaging element 17 in a distal-end portion of the inserted portion 11 and an imaging surface of the imaging element 17 is disposed in an image surface of the objective optical system 10.

The endoscope apparatus in FIG. 11C includes, as an optical system that transmits an image from the objective optical system 10 to the imaging element 17, a relay optical system 19 formed from a plurality of lenses. The relay optical system 19 may include a GRIN lens.

The present disclosure affords an advantage in that it is possible to observe both a forward direction and a lateral direction.

REFERENCE SIGNS LIST 10 objective optical system
20 optical unit
30 endoscope apparatus
1 first lens
2 second lens
1a first flat surface
1b first convex spherical surface
2a second flat surface
2b second convex spherical surface
3 holding member
31 first end surface
32 second end surface
4 window
6 aperture

The invention claimed is:

1. An objective optical system comprising a first lens and a second lens that are arranged in this order from an object side along a main optical axis, wherein:
the first lens has a partially spherical shape having a first flat surface and a first spherical surface;
the second lens has a partially spherical shape having a second flat surface and a second spherical surface;
the first flat surface is disposed on a side of the object and is inclined with respect to the main optical axis;
the second flat surface is disposed on an opposite side which is opposite from the side of the object and is perpendicular to the main optical axis;
light beams entering the first lens is refracted at the first flat surface and enters the second lens; and
light beams entering the first spherical surface is totally reflected at the first flat surface and enters the second lens.

2. The objective optical system according to claim 1, wherein an inclination angle θ of the first flat surface with respect the main optical axis satisfies formula (1) below:

$$A+\varphi 2-X2<\theta <90+\varphi 1-X1 \tag{1}$$

wherein
sin φ1=(0.8/n2),
sin X1=0.8,
sin φ2=(0.6/n2),
sin X2=0.6,
sin A=1/n1,
n1 is a refractive index of the first lens, and
n2 is refractive index of the second lens.

3. The objective optical system according to claim 2, wherein the inclination angle θ of the first flat surface with respect to the main optical axis is arcsin(n0/n1),
wherein
n0 is a refractive index of an external area of the objective optical system, and
n1 is the refractive index of the first lens.

4. The objective optical system according to claim 3, wherein the first lens and the second lens satisfy formula (2) below:

{Eq. 1}

$$d \le (R1 + R2)\left(\frac{n2}{\sqrt{n2^2 - 1}} - 1\right) \tag{2}$$

wherein
d is a spacing between the first lens and the second lens on the main optical axis,
R1 is a radius of curvature of the first lens,
R2 is a radius of curvature of the second lens, and
n2 is the refractive index of the second lens.

5. The objective optical system according to claim 4 further comprising an aperture that restricts a beam diameter of light entering the first lens.

6. The objective optical system according to claim 1, wherein the first lens or the second lens has a spherical segment shape in which a sphere is cut along a single flat surface.

7. An optical unit comprising an objective optical system, wherein the objective optical system comprises a first lens and a second lens that are arranged in this order from an object side along a main optical axis, wherein:
- the first lens has a partially spherical shape having a first flat surface and a first spherical surface;
- the second lens has a partially spherical shape having a second flat surface and a second spherical surface;
- the first flat surface is disposed on a side of the object and is inclined with respect to the main optical axis;
- the second flat surface is disposed on an opposite side which is opposite from the side of the object and is perpendicular to the main optical axis;
- light beams entering the first lens is refracted at the first flat surface and enters the second lens; and
- light beams entering the first spherical surface is totally reflected at the first flat surface and enters the second lens,
- wherein the optical unit further comprises a cylindrical holding member.

8. The optical unit according to claim 7, wherein
a first end surface, which is located at a first lens side, of the holding member has a flat inclined portion disposed on a flat surface that is same as the first flat surface, and
a second end surface, which is located at a second lens side, of the holding member is disposed on a flat surface that is same as the second flat surface or that is located at a side of the first lens relative to the second flat surface.

9. The optical unit according to claim 7, wherein an inclination angle θ of the first flat surface with respect the main optical axis satisfies formula (1) below:

$$A+\varphi2-X2 < \theta < 90+\varphi1-X1 \quad (1)$$

wherein
sin φ1=(0.8/n2),
sin X1=0.8,
sin φ2=(0.6/n2),
sin X2=0.6,
sin A=1/n1,
n1 is a refractive index of the first lens, and
n2 is refractive index of the second lens.

10. The optical unit according to claim 9, wherein the inclination angle θ of the first flat surface with respect to the main optical axis is arcsin(n0/n1),
wherein
n0 is a refractive index of an external area of the objective optical system, and
n1 is the refractive index of the first lens.

11. The optical unit according to claim 10, wherein the first lens and the second lens satisfy formula (2) below:

{Eq. 1}

$$d \leq (R1+R2)\left(\frac{n2}{\sqrt{n2^2-1}}-1\right) \quad (2)$$

wherein
d is a spacing between the first lens and the second lens on the main optical axis,
R1 is a radius of curvature of the first lens,
R2 is a radius of curvature of the second lens, and
n2 is the refractive index of the second lens.

12. The optical unit according to claim 11 further comprising an aperture that restricts a beam diameter of light entering the first lens.

13. The optical unit according to claim 11, wherein the holding member is a cylinder having a circular cross-section and satisfies formula (3) below:

$$0.8Db < Dc \leq Da \quad (3)$$

wherein
Da is a smaller one of a diameter of the first lens and a diameter of the second lens,
Db is a larger one of the diameter of the first lens and the diameter of the second lens, and
Dc is an inner diameter of the holding member between the first lens and the second lens.

14. The optical unit according to claim 7, wherein the first lens or the second lens has a spherical segment shape in which a sphere is cut along a single flat surface.

15. An endoscope apparatus comprising an objective optical system, wherein the objective optical system comprises a first lens and a second lens that are arranged in this order from an object side along a main optical axis, wherein:
- the first lens has a partially spherical shape having a first flat surface and a first spherical surface;
- the second lens has a partially spherical shape having a second flat surface and a second spherical surface;
- the first flat surface is disposed on a side of the object and is inclined with respect to the main optical axis;
- the second flat surface is disposed on an opposite side which is opposite from the side of the object and is perpendicular to the main optical axis;
- light beams entering the first lens is refracted at the first flat surface and enters the second lens; and
- light beams entering the first spherical surface is totally reflected at the first flat surface and enters the second lens.

16. The endoscope apparatus according to claim 15, wherein an inclination angle θ of the first flat surface with respect the main optical axis satisfies formula (1) below:

$$A+\varphi2-X2 < \theta < 90+\varphi1-X1 \quad (1)$$

wherein
sin φ1=(0.8/n2),
sin X1=0.8,
sin φ2=(0.6/n2),
sin X2=0.6,
sin A=1/n1,
n1 is a refractive index of the first lens, and
n2 is refractive index of the second lens.

17. The endoscope apparatus according to claim 16, wherein the inclination angle θ of the first flat surface with respect to the main optical axis is arc sin (n0/n1),
wherein
n0 is a refractive index of an external area of the objective optical system, and
n1 is the refractive index of the first lens.

18. The endoscope apparatus according to claim 17, wherein the first lens and the second lens satisfy formula (2) below:

{Eq. 1}

$$d \leq (R1+R2)\left(\frac{n2}{\sqrt{n2^2-1}}-1\right) \quad (2)$$

wherein
d is a spacing between the first lens and the second lens on the main optical axis,
R1 is a radius of curvature of the first lens,
R2 is a radius of curvature of the second lens, and
n2 is the refractive index of the second lens.

19. The endoscope apparatus according to claim 17 further comprising an aperture that restricts a beam diameter of light entering the first lens.

20. The endoscope apparatus according to claim 15, wherein the first lens or the second lens has a spherical segment shape in which a sphere is cut along a single flat surface.

* * * * *